Jan. 23, 1945.　　　　　H. G. CRAM　　　　　2,368,004
LOW CONSISTENCY REGULATOR AND VOLUME CONTROL
Filed April 9, 1943　　　　3 Sheets-Sheet 1
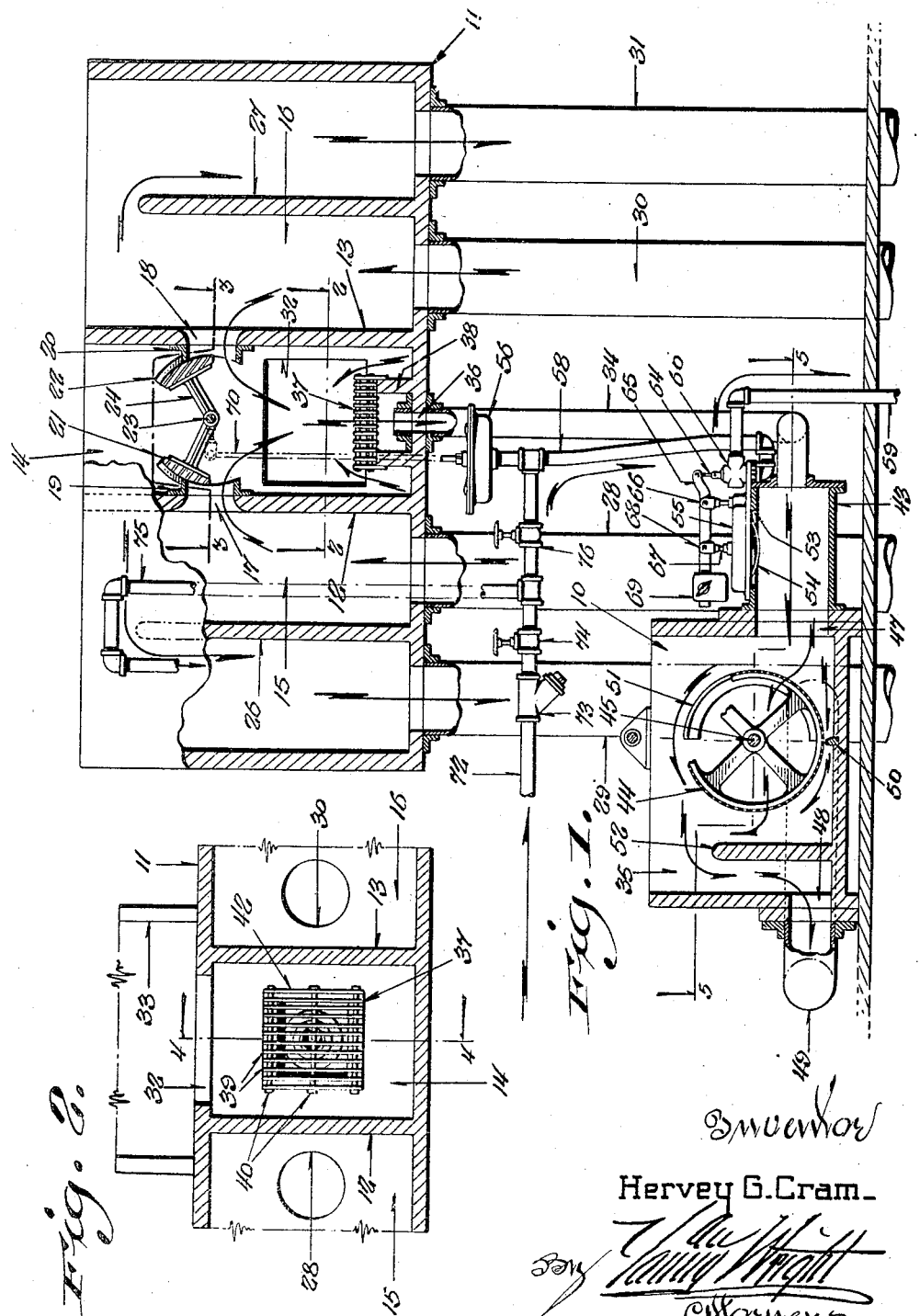
INVENTOR
Hervey G. Cram
ATTORNEYS Jan. 23, 1945. H. G. CRAM 2,368,004
LOW CONSISTENCY REGULATOR AND VOLUME CONTROL
Filed April 9, 1943 3 Sheets-Sheet 2

Inventor
Hervey G. Cram
By
Attorneys

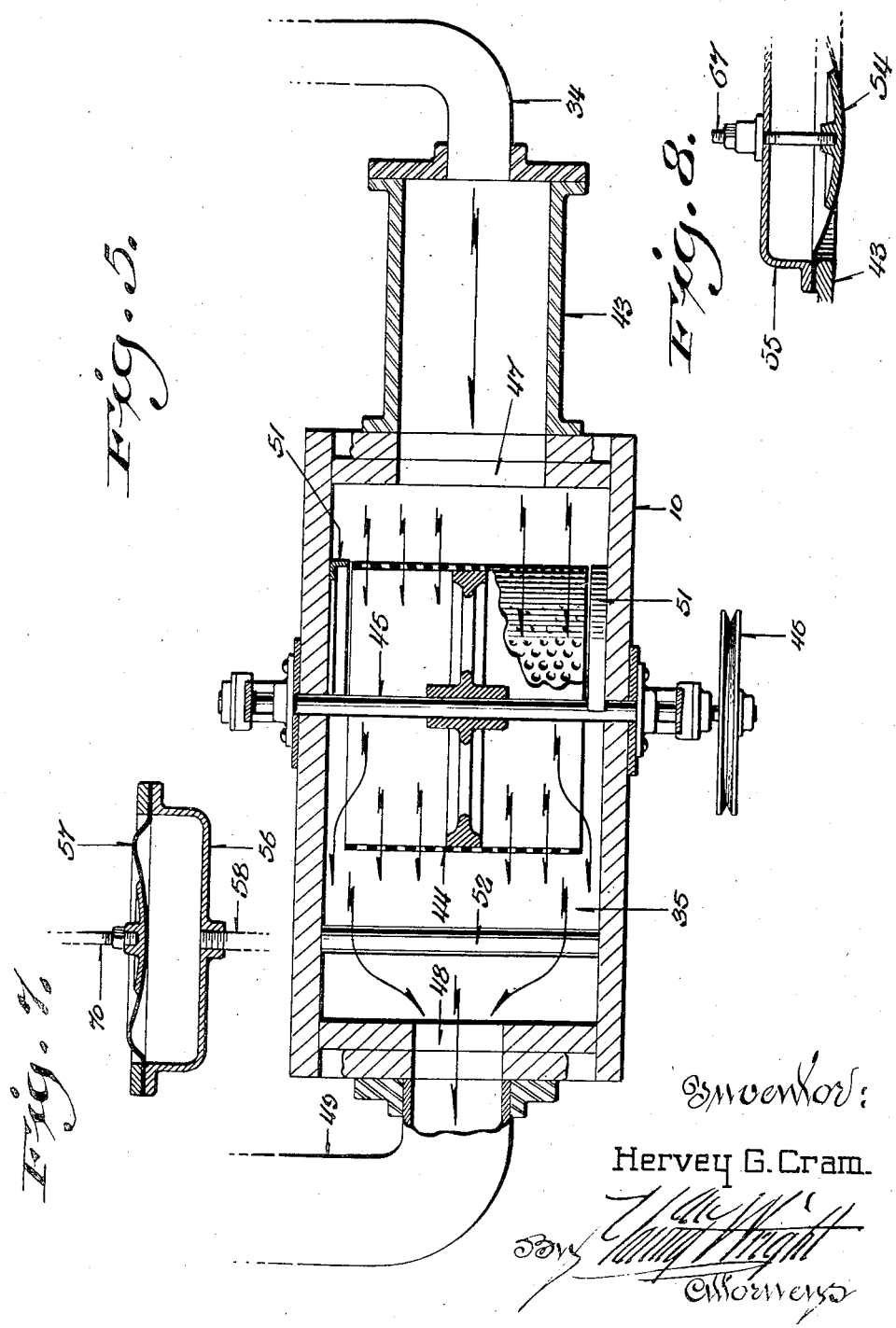

Patented Jan. 23, 1945

2,368,004

UNITED STATES PATENT OFFICE 2,368,004

LOW CONSISTENCY REGULATOR AND VOLUME CONTROL

Hervey G. Cram, Appleton, Wis., assignor to The Cram Company, Inc., Appleton, Wis., a corporation of Wisconsin Application April 9, 1943, Serial No. 482,391

9 Claims. (Cl. 137—78)

This invention appertains to means for effectively bringing about the automatic maintenance of a predetermined consistency of a liquid suspended material and a constant predetermined rate of volume flow of such consistency regulated material and is an improvement over my Patent No. 2,353,149, dated July 11, 1944.

One of the primary objects of my invention is to provide a single unitary appliance for simultaneously regulating and maintaining the consistency of a liquid suspended material and to maintain a constant predetermined rate of volume flow of such material to the point of use thereof, whereby to increase efficiency in certain processes, such as that of paper making in the screening, thickening, pumping, etc., of the pulp.

A further object of my invention is the provision of a transverse baffle in the vat on the downstream side of the cylinder, so as to retard the flow of liquid from the vat and to maintain a body of liquid on the downstream side of the cylinder at a constant level.

A further important object of my invention is the provision of a novel head box for supplying the pulp to the point of delivery (i. e. screens) and a sample thereof to the consistency regulator vat embodying a common mixing chamber for the pulp and white water.

A still further object of my invention is the provision of novel means for regulating the flow of the pulp and the water to the common mixing chamber relative to one another according to the consistency of the pulp as shown by the sample in the vat, whereby the volume and consistency of the pulp delivered from the common mixing chamber to the point of delivery can be effectively controlled.

A still further important object of my invention is the provision of a gate for controlling the flow of pulp to the common mixing chamber and a gate for controlling the flow of the white water to the mixing chamber operated from a common control shaft with means for actuating the shaft according to the head of the sample stock in the sample vat on the upstream side of the sample cylinder.

With these and other objects in view, the invention consists in the novel construction, arrangement and formation of parts, as will be hereinafter more specifically described, claimed and illustrated in the accompanying drawings, in which drawings:

Figure 1 is a vertical, sectional view through my novel apparatus for simultaneously regulating and maintaining the consistency of the pulp and the volume of the rate of flow of the pulp delivered to the point of use.

Figure 2 is a fragmentary, horizontal, sectional view taken on the line 2—2 of Figure 1 looking in the direction of the arrows.

Figure 5 is a horizontal, sectional view through the consistency regulator vat taken on the line 5—5 of Figure 1 looking in the direction of the arrows, the view being taken on a greater scale than Figure 1.

Figure 7 is an enlarged, fragmentary, detail, vertical, sectional view through the upper diaphragm mechanism for controlling the gates of the head box.

Figure 8 is an enlarged fragmentary, detail, vertical, sectional view through the lower diaphragm mechanism for controlling the operation of the shut-off valve shown in Figure 6.

Figure 3:
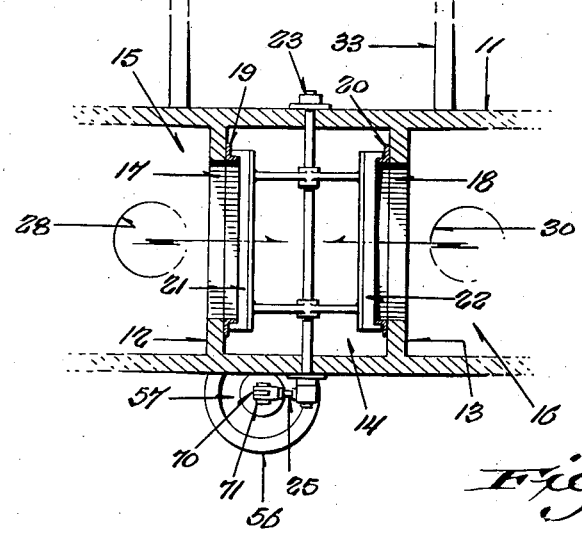
Figure 3 is a similar horizontal, sectional view but taken on the line 3—3 of Figure 1 looking in the direction of the arrows and illustrating the means for controlling the flow of the pulp and the white water to the common mixing chamber.
Figure 4:
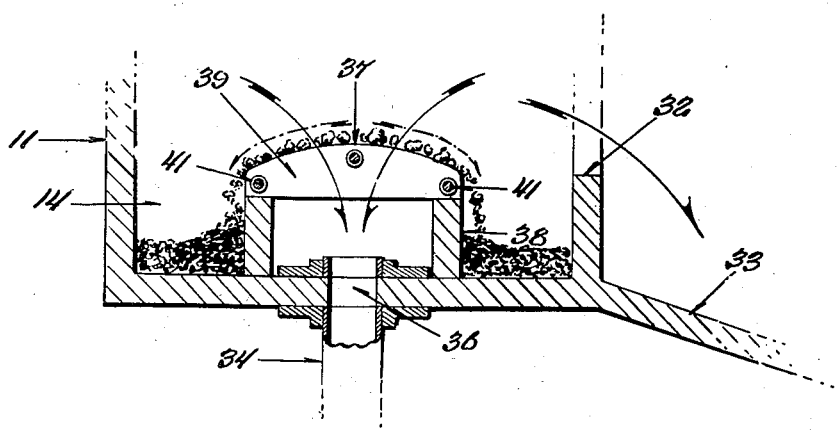
Figure 4 is an enlarged, fragmentary, transverse, sectional view through the common mixing chamber illustrating the device for removing knots and chunks of wood from the sample of pulp delivered from the common mixing chamber to the consistency regulator vat.

As a specific example of the purpose and advantage of this invention, there is selected for description and illustration, an operation in the paper pulp industry, wherein, the use of the invention is of advantage, and, a distinct improvement in the art of paper making, namely, the screening of pulp or paper stock.

Screening pulp or paper stock (hereinafter referred to as pulp) consists of passing a dilute mixture of pulp and water over slotted or perforated plates, the accepted pulp passing through, and the coarse materials, etc., unable to pass through the plates, being rejected with loss.

The consistency of this mixture of pulp and water, in order to satisfy the ordinary screening operation, is around 0.4% bone dry content, varying somewhat as to grade and kind of pulp in production, such as, ground wood, sulphite, kraft, etc. In any case, the pulp in the required state of dilution for screening will have a fluidity and appearance approximating that of milk.

At the present time, to my knowledge, there are no means for the determination of the consistency of the pulp as passing to the screens with any degree of accuracy, other than the method and mechanism herein described.

Now referring to the drawings in detail, which illustrate my invention in its application to the screening of pulp in the art of paper making, the numeral 10 generally indicates my combined consistency and volume control which includes a specially designed head box 11 for delivering the pulp to the screens (not shown).

The head box 11 is provided with a pair of spaced parallel transversely extending partitions 12 and 13, which divide the head box into a central compartment or mixing chamber 14, an end compartment or chamber 15 for unregulated pulp and a chamber 16 for unregulated white water. The partition 12 is provided with a transversely extending opening 17 for permitting the flow of the pulp from the chamber 15 to the common mixing chamber 14 and the partition 13 is provided with a similar opening 18 for the permitting the flow of the white water from the chamber 16 into the common mixing chamber 14. Gate or valve seats 19 and 20 are provided respectively for the openings 17 and 18 and the flow of pulp is controlled by a gate 21 and the flow of water is controlled by a gate 22. These gates 21 and 22 are firmly secured to a common operating shaft 23 by means of arms 24. The shaft 23 is rockably mounted in suitable bearings carried by the side walls of the head box and one end of the shaft protrudes beyond the head box and has rigidly secured thereto an operating crank 25. A dam 26 is disposed in the chamber 15 and a similar dam 27 is disposed in the chamber 16. Unregulated pulp is delivered through pipe 28 to compartment 15 at such a rate of volume flow as will assure an overflow of dam 26 under all conditions, and thereby establish and maintain a constant hydrostatic head on opening 17. Surplus pulp overflowing the dam 26 flows into a pipe 29 where the pulp is returned to the source of supply (not shown).

Water is delivered through pipe 30 to compartment 16 at such a rate of volume flow as to assure an overflow over dam 27 under all conditions, and thereby, establish and maintain a constant hydrostatic head on opening 18. Surplus water overflowing the dam 27 is returned by pipe 31 to the source of supply.

The ratio of flow of unregulated pulp to water is determined by the position of the gates 21 and 22 which are rigidly mounted on the common shaft 23. The shaft is rocked, by means, which will be later described.

At the present time, it is to be noted that the head box 11 is provided with a discharge opening 32 which communicates with the central common mixing chamber or compartment 14 below the control gates 21 and 22 and slightly above the bottom of the head box. This discharge opening 32 permits the flow of pulp to the stock spout 33, which in turn, delivers the pulp from the common mixing chamber to the screens (not shown.)

Communicating with the bottom of the common mixing chamber 14 is a small conduit pipe 34 for delivering a sample of the stock from the common mixing chamber to the sample vat 35. The lower wall of the discharge opening 32 constitutes a dam for assuring a constant head on the regulator sample inlet 36 which communicates with the pipe 34. A constant continuous sample of pulp is delivered free of knots and large chunks of wood to the pipe 34 by means of my knot screen 37. The sample inlet opening 36 is enclosed by upstanding flanges 38 which surround said inlet and the knot screen 37 covers the inlet and rests upon the flanges. The knot screen includes a plurality of equi-distantly spaced plates 39 and the plates are held in their assembled position on bolts 40. Suitable spacer sleeves 41 are mounted on the bolts 40 and are positioned between the plates. Side and wall plates 42 are also mounted on the bolts 40 and engage the outer surfaces of the side flanges.

The consistency regulator employed for controlling the position of the gates 21 and 22 include the sample vat 35 and the vat has communicating therewith a body 43 and by referring to Figure 1, it can be seen that the sample conduit pipe 34 leads into said body and the pulp then flows into the vat.

Rotatably mounted in the vat is the rotatable sample cylinder 44 and the cylinder is firmly secured to a transversely extending shaft 45 which is rotatably mounted in suitable bearings carried by the side walls of the vat. One end of the shaft protrudes beyond the vat and this end of the shaft is driven in any preferred manner, as by the means illustrated in my mentioned patent. As illustrated in Figure 5, the shaft has secured thereto a drive pulley 46. While I have shown the periphery of the cylinder carrying a screen 44, it is to be understood that the cylinder can be of the same type as illustrated in my said pending application. On the upstream side of the cylinder the vat is provided with an inlet opening 47 which communicates with the body 43 and the vat on the downstream side of the cylinder is provided with an outlet opening 48 which communicates with a discharge pipe 49 and this pipe can lead back to the source of supply of the pulp. During rotation of the cylinder, in a counter clock-wise movement, (by referring to Figure 1) a sheet of pulp will be formed on the cylinder on the upstream side thereof and the thickness of the sheet will be determined by the consistency of the pulp delivered to the vat from the common mixing chamber in the head box.

The lower wall of the vat has connected therewith a transversely extending, relatively short partition plate 50 which terminates in close proximity to the periphery of the cylinder 44.

Semi-circular strips or deckles 51 are fastened to the inner sides of the vat 35 and are so located that the outer surfaces thereof are parallel to the outer surface of the cylinder and in close proximity thereto. These deckles extend from the partition 50 to the top of the cylinder on the vertical center line, and, are located only on the upstream side.

The purpose of these deckles and the partition is to force substantially all of the sample to react with the cylinder shell on the upstream side, and, to permit some discharge of the filtrate on the downstream side, in addition to the filtrate passing out of the cylinder through the perforated cylinder shell. This occurs through the space between the edges of the cylinder shell and the inner walls of the vat.

The major portion of the water will pass out of the pulp and through the perforated cylinder shell leaving the solid material with some entrained water to form a continuous sheet of semi-solid pulp over the perforated cylinder shell. As the cylinder rotates, this sheet is being continuously swept off by the action of the filtrate passing out through the cylinder shell on the downstream side. In other words, the sheet is being formed continuously on the upstream side of the cylinder during rotation and is continuously and efficiently removed as it passes through the arc of the downstream side, thus avoiding the use of a doctor or water shower for that purpose. This is highly important, as a doctor will not properly clean the perforations of a cylinder shell, and, a water shower tends to upset the accuracy of the sample to the regulator.

Extending transversely of the vat on the downstream side of the cylinder and in front of the outlet opening 48 is a baffle 52, the purpose of which is to retard the flow of liquid from the outlet opening 48 and to maintain a body of liquid on the downstream side of the cylinder at a constant level.

Assured of a continuous sample at a constant rate of volume flow to the body 43 to contact with the rotating cylinder 44, there will be established an unstable head in the vat on the upstream side directly relative to the consistency of the sample as delivered to the regulator.

Explanation of the above is, that a higher consistency pulp will form a thicker sheet on the cylinder shell, thereby creating a greater resistance to the flow of liquid through the shell of the cylinder, and, the head on the upstream side of the cylinder will naturally increase to create an increased differential in head between the upstream and downstream sides of the cylinder to balance this condition, there being no passage for water to the interior of the cylinder other than through the perforations of the cylinder shell.

The flow of filtrate between the cylinder and the partition 50 functions to wash off the last vestige of pulp which might be adhering to the periphery of the cylinder.

The body 43 has its upper end provided with an enlarged opening 53 covered by a diaphragm 54. This diaphragm is carried by a suitable shell or casing 55.

Obviously the diaphragm will be affected by the head of the sample on the upstream side of the cylinder and the movement of the diaphragm in accordance with the head is utilized for actuating the gates 21 and 22, through an apparatus, which will now be described.

Figure 6:
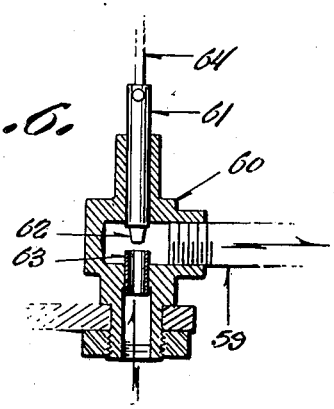
Figure 6 is an enlarged, detail, sectional view through the pilot valve employed for maintaining a head of water on the control mechanism for actuating the gates for the pulp and white water in the common mixing chamber.

This apparatus includes a diaphragm chamber 56, the upper end of which is closed by a diaphragm 57. Communicating with the lower end of the chamber is an upright liquid conducting pipe 58 and discharge of water through the pipe 58 to a discharge pipe 59 is controlled by a shut-off valve 60. The valve is shown in detail in Figure 6 and comprises a sliding valve stem 61 having formed on its lower end a valve head 62 which is adapted to be moved toward and away from the valve seat 63. The valve seat 63 communicates with the outlet end of the pipe 58 and obviously the movement of the valve stem 61 toward and away from the valve seat controls the discharge of liquid from the discharge pipe 58 to the discharge pipe 59. Connected to the upper end of the valve stem, by means of a pivoted link 64, is an operating lever 65. The lever 65 is rockably mounted intermediate its ends on a pivot pin 66 carried by a bracket mounted on the case of the diaphragm 54. Bearing against the diaphragm, through the medium of a button or head, is a slide rod 67 and this slide rod is pivotally connected to the operating lever 65 by means of a pivot 68. The slide rod 67 is located on one side of the pivot point of the operating lever and the slide rod is held in contact with the diaphragm 54 by an adjustable weight 69.

Connected to the diaphragm 57 is an operating rod 70 and this rod, in turn, is operatively connected by means of a pivot 71 with the crank 25 carried by the common shaft 23 for the gates 21 and 22.

Fluid, usually water, is delivered to a pipe 72 under pressure to and through a strainer 73 to the vertical pipe 58. Flow of water, under pressure, through the pipe 72 is controlled by a hand regulating valve 74. In order to maintain a head of water in the pipe on the diaphragm 57, an overflow stand pipe 75 communicates with the pipe 72 at one side of the regulating valve 74. The overflow stand pipe 75 may be of any height required to assure the head necessary for the operation of the diaphragm 57 and the gates 21 and 22. A control valve 76 is arranged in the length of the pipe 72 between the overflow stand pipe 75 and the vertical pipe 58 and the purpose of this valve is to fix a constant rate of volume flow to the pipe 58.

From the above, it is believed that the operation of my consistency and volume control method and mechanism is clear, but briefly, the operation of the control is as follows.

The head on the upstream side of the cylinder 44 in the vat 35 varies with the consistency of the sample passing through the vat, which effects a corresponding pressure on the diaphragm 54 effecting a vertical movement relative thereto, which is transmitted through rod 67, lever 65, link 64, valve stem 61 of the pilot or shut-off valve 60. Upward movement of the diaphragm 54 correspondingly depresses the valve stem 61 toward its seat 63 thereby restricting the discharge of the water to the pipe 59, thus effecting an increased pressure in the line or pipe 58 and on the diaphragm 57 which operates the gates 21 and 22 of the head box, and reproportions the delivery of unregulated pulp and water in the common mixing chamber 14 to reestablish the required predetermined consistency.

As the gate 22 tends to close, the gate 21 tends to open and thus the opening and closing of the gates directly proportions the flow pulp and water to the common mixing chamber and also accurately governs the rate of volume flow from the common mixing chamber to the screens and it can be seen that this rate of volume flow remains constant.

The main features of my improvements reside in the arrangement of cylinder 44 and vat 35 to provide for the passage of the filtrate directly through the cylinder, i. e., water being passed through the cylinder shell perforations to the interior of the rotating cylinder on the upstream side and being passed out of the cylinder through the same perforations on the downstream side, thereby providing the natural cleaning effect to the surface and perforations of the cylinder shell and avoids the necessity of a doctor or water shower for this purpose.

The semi-circular strips or deckles 51 on the upstream side of the cylinder provides a comparatively narrow opening on each side of the cylinder shell at the downstream side of the cylinder for the discharge of surplus filtrate out of the cylinder, in addition to that discharged through the perforations.

The purpose of providing for surplus discharge out of the cylinder is to establish a constant head of filtrate inside the cylinder, for example; with a constant volume flow to compartment or body 43 and to the upstream side of the cylinder, the rate of flow of filtrate through the cylinder shell will vary inversely with the consistency of the pulp sample delivered to the vat.

Great stress is laid on the arrangement of the regulator box relative to the vat and the novel method and means for accurately controlling the position of the gates 21 and 22 according to the head of the pulp in the vat on the upstream side of the cylinder.

Changes in details may be made without departing from the spirit or the scope of my invention, but what I claim as new is:

1. A consistency responsive apparatus for pulp comprising a vat having an inlet opening for pulp and a discharge opening for pulp, a rotary cylinder in said vat between the inlet opening and the discharge opening so constructed and arranged that on rotation about its axis, liquid passes therethrough at right angles to its axis, and solid matter collects on its periphery at a rate depending on the consistency of the stock, a transversely extending partition in said vat between the cylinder and the bottom of the vat so arranged as to prevent the passage of solid matter but to permit the passage of a slight amount of the liquid portions of the pulp between the cylinder and bottom of the vat, arcuate side deckles disposed between the sides of the vat and the cylinder on the upstream side of the cylinder arranged to prevent the passage of pulp and but slight amounts of liquid between the cylinder and vat on the upstream side of said cylinder, whereby to hold back the solid matter on the inlet side of the vat in accordance with the consistency of the pulp, and a baffle within the vat spaced between the pulp discharge opening and the cylinder to maintain liquid on the downstream side of the cylinder at a constant level.

2. A consistency responsive apparatus for thin pulp or stock comprising a vat having an inlet opening for stock and a discharge opening for stock, a rotary cylinder in said vat between the inlet opening and the discharge opening so constructed and arranged that on rotation about its axis, liquid passes therethrough at right angles to its axis and solid matter collects on its periphery at a rate depending on the consistency of the stock, deckles disposed between the sides of the vat and the cylinder on the upstream side of the cylinder, and other means between the vat and the cylinder for preventing the passage of solid matter and but slight amounts of liquid between the cylinder and bottom of the vat and between the sides of the cylinder and the vat on the upstream side of the cylinder, whereby to hold back the stock on the inlet side of the vat in accordance with the consistency of the stock, and an upstanding baffle plate in said vat between the cylinder and the discharge opening to maintain liquid on the downstream side of the cylinder at a constant level.

3. A consistency responsive apparatus for thin stock comprising a vat having an inlet opening and a discharge opening, a head box having a compartment for pulp and a compartment for water and a common mixing chamber for the pulp and water, means for controlling the flow of pulp and water to the common mixing chamber, means connecting the common mixing chamber with the vat and for maintaining a constant head of pulp on the inlet opening of the vat, means in the vat for varying the head of pulp in the vat in accordance with the consistency of the pulp, means responsive to change in pressure caused by the difference in the head of pulp in the vat, and means for operating the control means for the flow of pulp and water to the common mixing chamber from said means responsive to change in pressure, said means for operating said control means being so constructed and arranged that an increase in pulp consistency will cause an increase in the flow of water to said mixing chamber while decreasing the flow of pulp, maintaining the sum of water flow and pulp flow constant.

4. A consistency responsive apparatus for thin stock for maintaining a required consistency of the stock comprising a vat, a head box having a chamber for stock, a chamber for water and a common mixing chamber for the stock and water, means for maintaining the heads of water and stock constant in the chambers therefor, gates movable in conjunction with one another for the controlling of stock and water in the common mixing chamber, said common mixing chamber having an outlet above the bottom thereof for the discharge of mixed stock and water to the point of use, means for supplying a sample of the mixed stock and water to the vat at a constant rate, means in the vat between the inlet and outlet thereof for acting on the stock for retarding the flow of stock through the vat according to the consistency of the stock, and means for operating the gates according to the head of stock in the vat retarded by said stock retarding means, said means for operating the gates being so constructed and arranged that an increase in pulp consistency will cause an increase in the flow of water to said mixing chamber while decreasing the flow of pulp, maintaining the sum of water flow and pulp flow constant.

5. A consistency responsive apparatus for thin stock for maintaining a required consistency of the stock comprising a vat, a head box having a chamber for stock, a chamber for water and a common mixing chamber for the stock and water, means for maintaining the heads of water and stock constant in the chamber therefor, gates movable in conjunction with one another for controlling the flow of stock and water to the common mixing chamber, the common mixing chamber having an outlet above the bottom thereof for the discharge of mixed stock and water to the point of use, means for supplying a sample of the mixed stock and water to the vat at a constant rate, means in the vat between the inlet and outlet thereof for acting on the stock for retarding the flow of stock through the vat according to the consistency of the stock, and means for operating the gates according to the head of stock in the vat retarded by said stock retarding means, said means including a diaphragm sensitive to pressure caused by the head of pulp, and said means being so constructed and arranged that an increase in pulp consistency will cause an increase in the flow of water to said mixing chamber while decreasing the flow of pulp, maintaining the sum of water flow and pulp flow constant.

6. A consistency responsive apparatus for thin stock for maintaining a required consistency of the stock comprising a vat, a head box having a chamber for stock, a chamber for water and a common mixing chamber for the stock and water, means for maintaining the heads of water and stock constant in the chambers therefor, gates movable in conjunction with one another for controlling the flow of stock and water to the common mixing chamber, the common mixing chamber having an outlet above the bottom thereof for the discharge of mixed stock and water to the point of use, means for supplying a sample of the mixed stock and water to the vat at a constant rate, means in the vat between the inlet and outlet thereof for acting on the stock for retarding the flow of stock through the vat according to the consistency of the stock, and means for operating the gates according to the head of stock in the vat retarded by said stock retarding means, said means including a diaphragm sensitive to pressure caused by the head of pulp, a second diaphrgm sensitive to change in pressure, means including a conduit for supplying liquid under a constant pressure and head to said second diaphragm, and a valve operated from the first diaphragm for controlling the flow of liquid from the conduit, to vary said head and pressure, said means, diaphragm and valves being effective to increase the flow of water and decrease the flow of pulp to the mixing chamber with an increase in pulp consistency but maintaining the sum of water flow and pulp flow constant.

7. A consistency responsive apparatus for thin stock for maintaining a required consistency of the stock comprising a vat, a head box having a chamber for stock, a chamber for water and a common mixing chamber for the stock and water, means for maintaining the heads of water and stock constant in the chambers therefor, gates movable in conjunction with one another for controlling the flow of stock and water to the common mixing chamber, the common mixing chamber having an outlet above the bottom thereof for the discharge of mixed stock and water to the point of use, means for supplying a sample of the mixed stock and water to the vat at a constant rate, means in the vat between the inlet and outlet thereof for acting on the stock for retarding the flow of stock through the vat according to the consistency of the stock, and means for operating the gates according to the head of stock in the vat retarded by said stock retarding means, said means including a diaphragm sensitive to pressure caused by the head of pulp, a second diaphragm sensitive to change in pressure, means including a conduit for supplying liquid under a constant pressure and head to said second diaphragm, and a valve operated from the first diaphragm for controlling the flow of liquid from the conduit, to vary said head and pressure, said second diaphragm having a direct operative connection with said gates, said means, diaphragms and valves being effective to increase the flow of water and decrease the flow of pulp to the mixing chamber with an increase in pulp consistency but maintaining the sum of water flow and pulp flow constant.

8. In a consistency regulator and volume control including a vat for receiving a supply of sample stock, a diaphragm senstive to change in pressure in said vat caused by change in a head of said sample stock, a head box for stock including a compartment for stock, a compartment for water and a common mixing compartment for the stock and water, the common mixing compartment having a discharge for delivering mixed stock and water to the point of use, means for supplying a constant sample of the mixed stock and water from the common mixing chamber to the vat to create a head of stock, a control mechanism for governing the flow of stock and water to the common mixing compartment from the first two mentioned compartments of the head box, and means actuated from the diaphragm for operating said control mechanism, said last mentioned means and control mechanism being effective to increase the flow of water to said common mixing chamber while decreasing the flow of pulp to the mixing chamber but maintaining the sum of water flow and pulp flow constant.

9. In a consistency regulator and volume control including a vat for receiving a supply of sample stock, a diaphragm sensitive to pressure in said vat caused by a head of sample stock, a head box including a compartment for stock, a compartment for water and a common mixing chamber for the water and stock, said common mixing chamber having an outlet for the mixed stock and water for delivery to the point of use, means for maintaining a constant flow of stock and water from said common mixing chamber to the head of stock, the compartment for the stock and the compartment for the water each having an outlet communicating with the common mixing chamber, a gate for controlling flow through each of the outlets, and means for simultaneously actuating the gates from the diaphragm, the actuating means being effective to cause an increase in the flow of water to said common mixing chamber while decreasing the flow of pulp therethrough but maintaining the sum of water flow and pulp flow constant.

HERVEY G. CRAM.